Sept. 20, 1938.　　　E. E. BERGLAND　　　2,130,785
BRAKING MECHANISM AND THE LIKE
Filed June 24, 1935　　　4 Sheets-Sheet 2
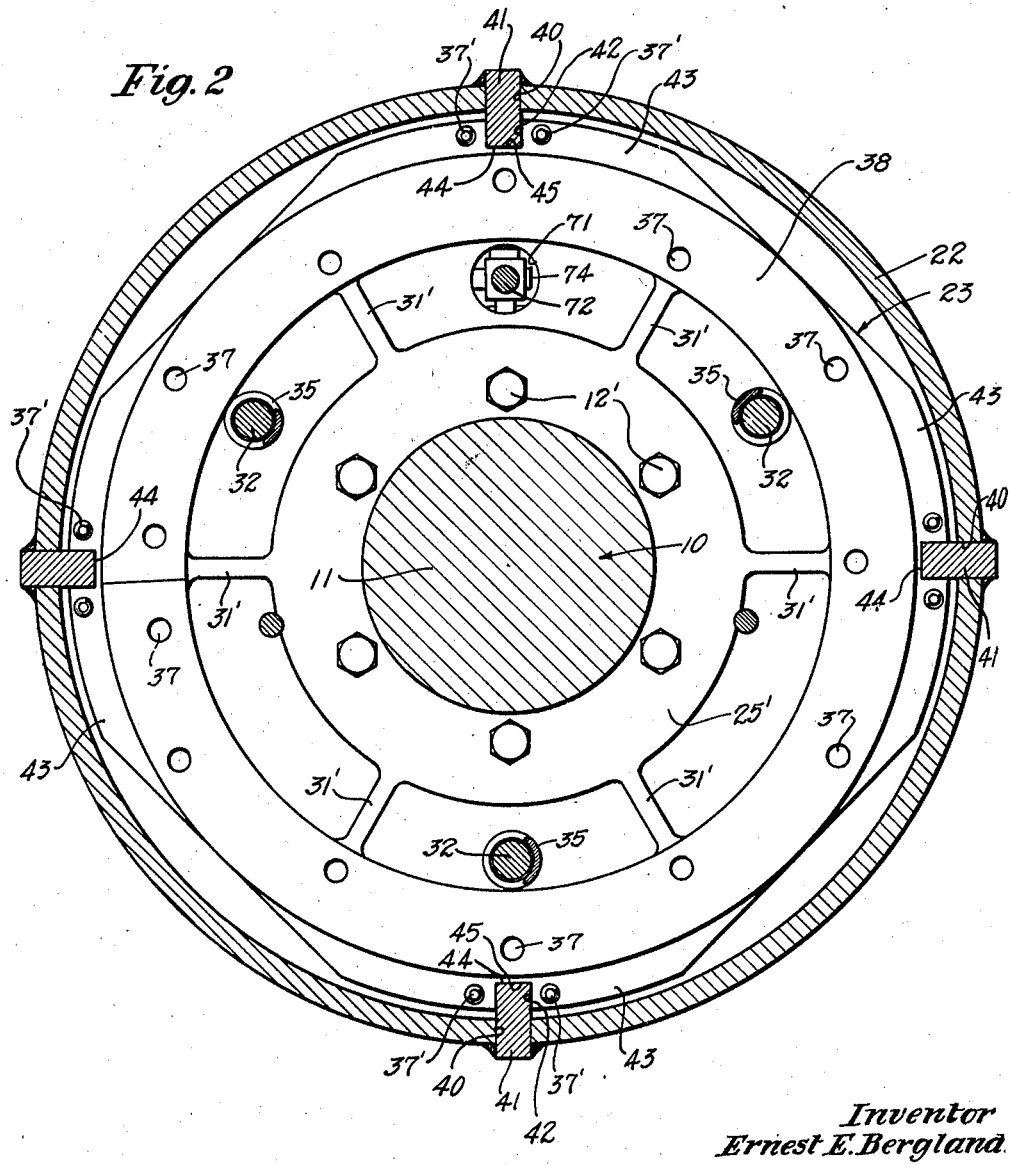
Fig. 2
Inventor
Ernest E. Bergland
Attorney.

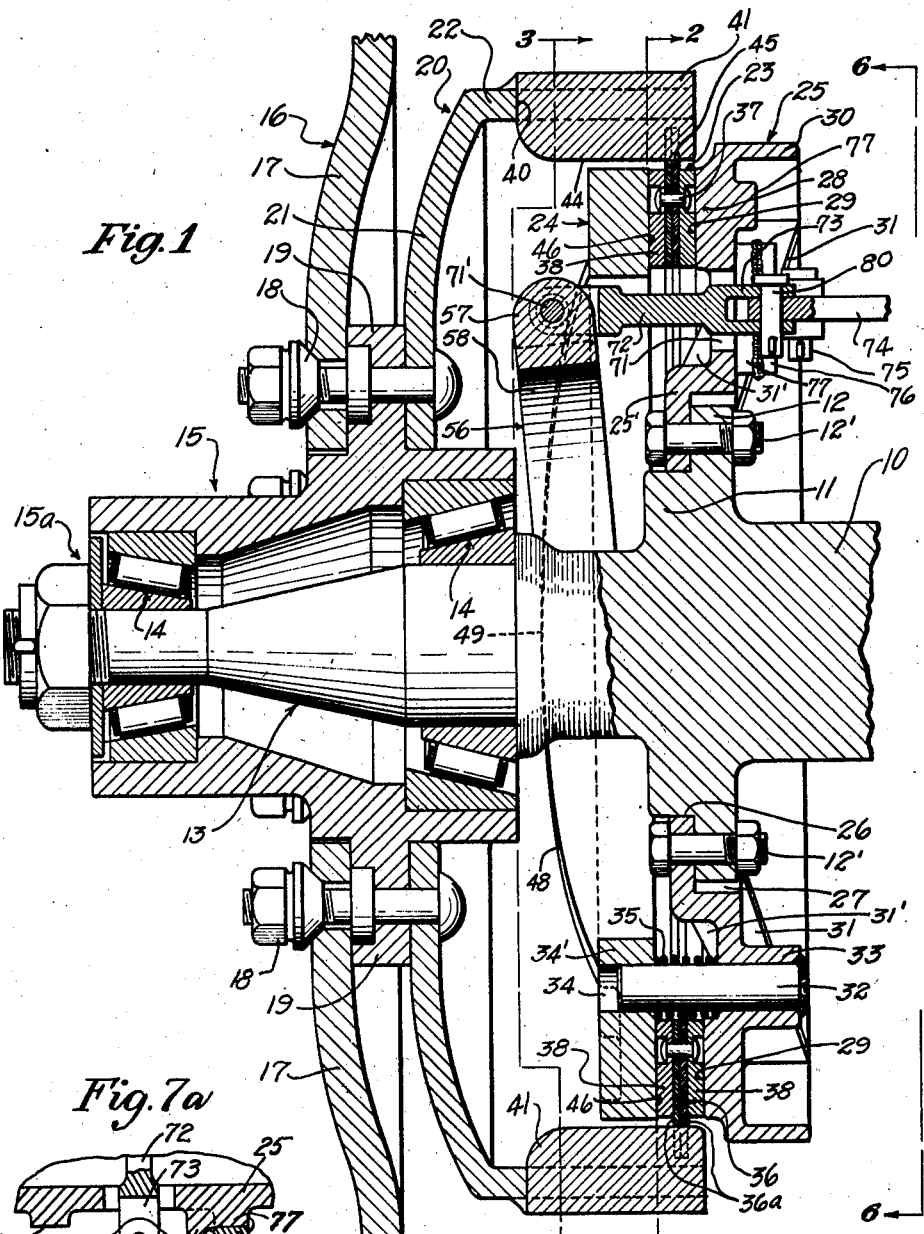
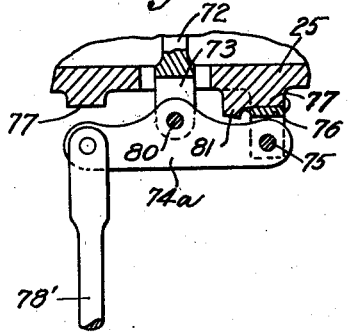

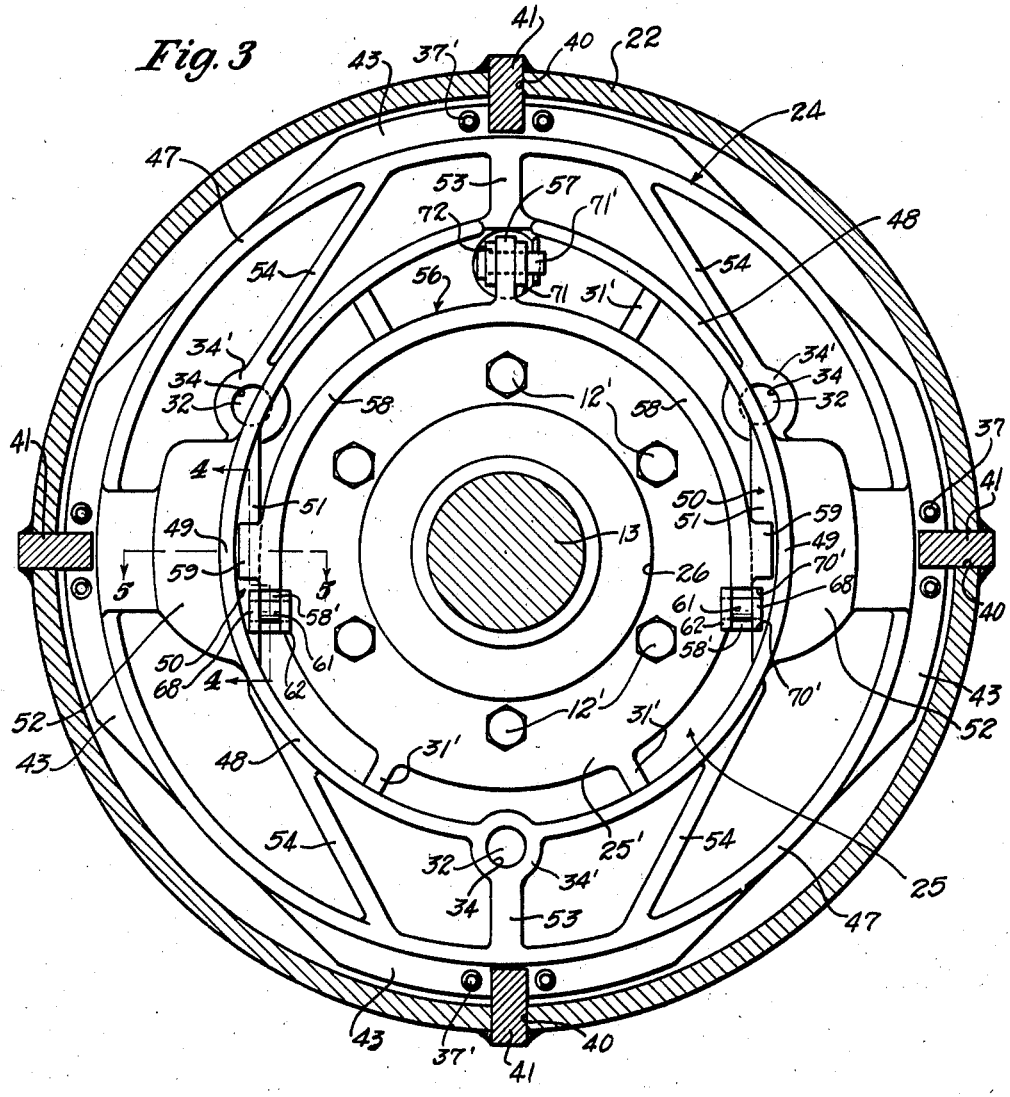

Sept. 20, 1938. E. E. BERGLAND 2,130,785
BRAKING MECHANISM AND THE LIKE
Filed June 24, 1935 4 Sheets-Sheet 4
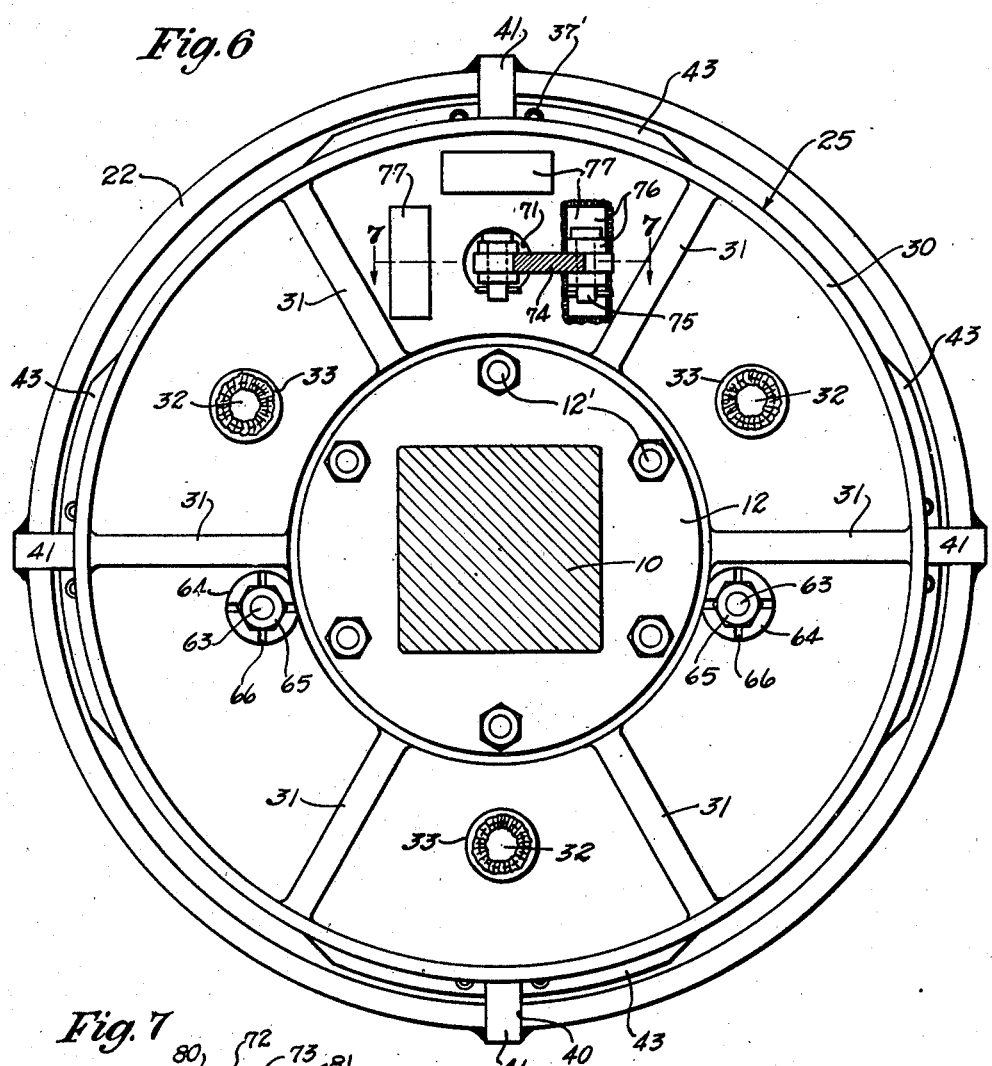
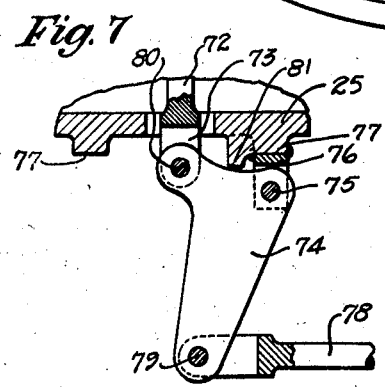
Inventor
Ernest E. Bergland.
Attorney.

Patented Sept. 20, 1938

2,130,785

UNITED STATES PATENT OFFICE 2,130,785

BRAKING MECHANISM AND THE LIKE

Ernest E. Bergland, Los Angeles, Calif., assignor, by mesne assignments, to himself and Hugo Kirchhofer, Los Angeles, Calif.

Application June 24, 1935, Serial No. 28,090

7 Claims. (Cl. 188—72)

This invention relates generally to a mechanism adapted to be interposed between axially alined elements which are, in one condition of the mechanism, adapted to have relative rotation—a change in the condition of the mechanism serving to set up frictional resistance to such relative rotation.

The mechanism is of wide adaptability in many situations where it is desirable frictionally to check relative rotation of such elements and finally effect a frictional lock therebetween, whether this frictional lock be for the purpose of transmitting rotative drive from one element to the other, or for the purpose of exerting braking force on one of the elements. I have chosen to illustrate an embodiment of the invention wherein one of the alined members is a vehicle wheel and the other a stationary element carried by the vehicle frame, the mechanism thus being adapted to act as a vehicle brake. Therefore, from this point on, I will treat the mechanism as a vehicle brake, a purpose to which it is particularly well adapted, but this treatment is not to be considered as limiting the invention, considered in its broader aspects.

The brake is of the disk type and it is among the objects of the invention to provide a dependable, durable, and relatively simple brake of this type which shall be highly efficient in operation. In this connection, the mechanism is such that powerful braking force may be applied evenly and smoothly over relatively large braking areas, to the end that heavy loads may be controlled with minimum effort on the part of the operator and with minimum wear on the brake elements. While the application is not limited thereto, it has been found that the brake is particularly effective on heavy duty trucks where the service conditions are extremely severe.

It is one of the objects of the invention to provide a "soft" brake which will be capable of controlling heavy loads by a gradual, smooth checking thereof, and yet be capable of securing a full check in minimum time if an emergency arises.

It is also an object of the invention to provide a brake which, while protected from weather and from water or loose road-surfacing material which may be thrown thereagainst during travel, is readily accessible for inspection or repair, and wherein the wearable friction elements may be replaced with ease and dispatch.

The invention also contemplates the provision of a friction ring of novel character whereby it may be kept to minimum thickness (thus contributing to an advantageously rapid dissipation of heat) and yet remain undistorted by the relatively high temperatures to which it is subjected.

Other elements of the brake assembly which are subjected to heavy load are so fashioned that, without sacrificing strength or rigidity by unduly reducing sizes, it is assured that the heat generated by the braking action is dissipated rapidly, to obvious advantage. The pressure ring of the assembly is devised so, in spite of the fact that the actuating pressure is applied thereto only at two points, the effective force is distributed evenly over the entire ring, contributing to even wear on the brake elements and to smooth braking action.

The brake is of such structure that it may be easily substituted for band-type brakes on vehicles originally equipped with the latter, it being possible, though not necessary, to utilize certain elements of such original equipment in my installation.

I have also provided novel and particularly effective means for adjusting the brake elements to vary the effective braking force or to take up wear. Likewise, I have provided novel means for actuating the brake, but this, as well as other features of advantage and novelty, may be better understood from consideration of the following detailed description, reference being had to the accompanying drawings, in which Fig. 1 is a medial section taken through a brake embodying my invention;

Fig. 2 is a section on line 2—2 of Fig. 1;

Fig. 3 is a section on line 3—3 of Fig. 1;

Fig. 4 is a fragmentary section on line 4—4 of Fig. 3;

Fig. 5 is a fragmentary section on line 5—5 of Fig. 3;

Fig. 6 is an elevation of the brake as viewed from the position of line 6—6 of Fig. 1, and Fig. 7 is a fragmentary section on line 7—7 of Fig. 6.

Fig. 7a is a view generally similar to Fig. 7 but showing a variational form of lever.

The brake includes a pressure-taking plate or flange concentric with an equipped axle and mounted stationarily with relation to the wheel-supporting structure carried by the vehicle frame, a pressure applying member or ring spaced from and movable axially toward and away from the flange, a friction ring floating between the flange and pressure ring and connected to the wheel for rotation therewith, and means for shifting the pressure ring axially to actuate the brake.

In the drawings I have illustrated in some detail a stationary or stub axle of a vehicle and the wheel-parts associated therewith, but it will be understood the showing and following description thereof are not in any way to be considered as limitative on the invention, they being given only for the purpose of describing the installation of my improved brake in connection with a shaft and wheel assembly typical of one form of wheel-mounting.

Here, the pressure-taking flange is stationarily mounted with respect to the axle itself, but it will be seen that the invention more broadly contemplates any other point of attachment for the flange which will give the same effect. For instance, the same effect may be gained by mounting the flange on a stationary frame-supported housing for a driven axle. Accordingly, where in the appended claims, reference is made to the flange or pressure-taking member as being stationary or to the flange as being mounted on a wheel-supporting member, it is to be understood that such reference is not to be considered as limiting the claims to a situation where the mounting is on the axle, itself.

Referring particularly to Fig. 1, numeral 10 indicates a stationary axle having integral flanges 11, 12 and a spindle-portion 13, the latter supporting bearings 14 whereby the hub 15 of vehicle wheel 16 (here incompletely shown, but being indicated as of the disk type) is mounted for free rotation about the spindle. Bearings 14 and retention assembly 15a hold the hub against shifting axially of the spindle.

Wheel disk 17 is bolted at 18 to hub flange 19, bolts 18 also serving to hold brake-drum 20 to that flange. As will appear, drum 20, which may be considered a cup-shaped member made of body portion 21 and a band or ring 22, is utilized to hold a friction ring, generally indicated at 23, of the brake mechanism against rotation with respect to the wheel. Member 20, as here shown, represents the drum of a usual band-type brake, it thus being possible to employ part of an original band-type brake assembly for cooperation with other elements of my disk type assembly, with consequent economic advantage. Such a standard drum also serves effectively as a housing for my brake elements, protecting them from adverse weather and road conditions. However, it is to be understood that my invention is not limited to the employment of such a drum, and that the invention contemplates broadly the provision of any suitable means for keying the friction ring to the wheel and any suitable protective shield.

The brake includes a pair of axially alined and spacedly opposed pressure rings 24 and 25 between which the friction ring 23 is interposed. In order better to distinguish between the two pressure rings, ring 25 may be considered a stationary pressure-taking member or flange, while ring 24 may be considered a movable pressure member or ring, though this terminology is not to be considered as controlling on the claims where the description of these parts is more generally expressed.

Flange 25 is preferably in the form of an iron casting having a central bore 26, in its hub-portion 25′, to take axle flange 11, and a counterbore 27 to take axle flange 12. Bolts 12′ hold the flange 25′ rigidly to axle flange 12. From one side face of the casting there projects a portion 28 which presents annular friction face 29 towards friction ring 23, while marginal flange 30 projects from the opposite side of the face.

Radial ribs 31 extend from flange 30 to the edge of counterbore 27, these ribs, with flange 30, serving to strengthen and stiffen member 25 and prevent its deformation under the pressure which is applied thereto during brake-actuation. Flange 25 is also stiffened by ribs 31′ (Fig. 2) which extend radially from portion 28 to hub portion 25′.

I will now describe the illustrated mounting of ring 24 on flange 25, though it will be understood the mounting may vary appreciably from that illustrated, without departing from the spirit and scope of my broader claims. Here, I have shown pins 32 welded or otherwise suitably secured in bosses 33 which extend from one side of flange 25, the pins projecting from the other side of the flange and being entered in holes or guideways 34 in ring 24 and its bosses 34′. The pins may be provided in any desired number, though preferably there are more than two. I have illustrated three such pins which are spaced at equal angles about the flange. Pins 32 provide a slide mounting for ring 24 so the latter may be shifted axially to vary the pressural engagement between ring 24, friction ring 23 and flange 25.

Compression springs 35 on pins 32 tend to spread rings 24 and 25 apart so, until force is applied against ring 24 in a direction toward flange 25, friction ring 23, as rotated by wheel 16, may run freely between rings 24 and 25, thus normally maintaining the brake in "off" condition. Means for limiting the extent of movement of ring 24 under the influence of springs 35 toward release or "off" position will be described later.

Friction ring 23 is made up of a laminated body member 36, the laminations 36a being relatively thin rings of sheet metal, such as a good grade of hard red steel, rivets 37 serving both to hold the laminations together and also to hold facing rings 38, made of any suitable brake lining or friction material, such as asbestos woven into a wire fabric, to the opposite side of the laminated body member. By reason of this construction, the body member of the friction ring may be held down to minimum thickness so heat generated by the pressural engagement of the brake-parts during brake application may be readily dissipated therefrom, and thus greatly diminish the danger of "burning out" lining rings 38 and vastly increase the life of those rings. Yet, by reason of the laminated characteristics thereof, the relatively thin body member 36 will remain flat and undistorted, even though the temperature be relatively high during periods of brake-application.

It is found that the performance of a disk brake depends very materially upon the maintenance of flat friction rings. Heretofore it has been considered that the only way they can be maintained in this condition was to make them of considerable thickness, but this has resulted in rings of such bulk that heat could not be readily dissipated therefrom, it following that the linings quickly burned out. By my provision I have gained the advantage of a thick ring as regards resistance to distortion, and the advantage of a thin ring as to rapid dissipation of heat.

As stated in the fore part of the specification I have utilized drum 20 for keying the friction ring to wheel 16, but it will be understood the invention, considered in its broader aspects, is not limited to such provision. However, where such advantage is taken of a previously installed brake drum 21, said drum is prepared for my installation by cutting any suitable number of notches 40

(here shown as four in number and spaced at equal angles about the drum) in band 22, and welding into each of these notches a key 41, each key projecting inwardly from the inner peripheral face of band 22.

The body member of friction ring 23 is provided with key-ways 42 to take keys 41, these ways being provided in portions 43 which extend radially beyond facings 38. Preferably, the laminations of the body member are riveted together through these extended portions at opposite sides of ways 42 and as designated at 37'. Rivets 37' do not, of course, have to be removed when occasion arises for replacing the facings or linings 38 on the friction ring.

While keys 41 coact with friction ring 23 in a manner to hold such ring against rotation with respect to wheel 16 and yet allow said ring to shift axially, the inner faces 44 of the keys engage the bottoms 45 of ways 42 to hold friction ring 23 annularly spaced from band 22 and in axial alinement with ring 24 and flange 25 at all times. The friction ring is thus supported entirely independently of the pressure rings and may be considered as "floating" with respect thereto.

Ring 24 is preferably an iron casting, one face 46 thereof being machined to provide a friction surface presented to the friction material or brake lining on ring 23, while outer and inner marginal flanges 47 and 48, respectively, extend from the opposite face. Flange 48 inclines outwardly to give it increased height at diametrically opposite sides of the ring, as at 49. Ledges or bearing blocks 50, integral with ring 24, extend inwardly from the inner peripheral face of the ring, their upper bearing faces 51 lying below the tops of flange portions 49. Extending between flange 47 and flange 48 are heavy reinforcing ribs 52 while radial ribs 53 extend between the two flanges at points equally spaced from ribs 52. Ribs 54 extend angularly between the flanges 47 and 48 at points between ribs 52 and 53, two of these ribs 54 being terminally integral with bosses 34' which, in turn, are merged into ribs 52 and flange 48.

The flange-and-rib structure described stiffens ring 24 so it will be rigid and unyielding when braking pressures are applied thereto, a feature of great importance to proper brake action, as will be readily understood. It will hereinafter appear that the actuating pressure is applied to ring 24 through blocks 50, the pressure thus being concentrated on two diametrically opposite points. However, with the flange and rib structure described, and particularly due to the heavy rib construction at these points of concentration and the provision of connecting ribs extending from these points to ring portions remote therefrom, the forces are so distributed that even pressural effect is given over the entire effective face 46 of the ring. All the ribs also aid in rapid dissipation of heat.

Opposite one of the ribs 53, ring 24 with its flange 48 is, in effect, cut back to receive certain operating mechanisms now to be described.

A rockable actuating yoke or fork 56 is provided with a draft tongue 57, while its arms 58 carry, at diametrically opposite points, bearing lugs 59 having arcuate faces 60 adapted to bear on faces 51 of block 50 (Fig. 4). Beyond lugs 59, arms 58 are provided with terminal hooks 58' which take pins 61 of posts or clevises 62, the latter having shanks 63 extended through flange 25 and its integral bosses 64. Nuts 65 threaded on shank 63 serve to adjust the posts longitudinally and thereby, through pin and hook connection 58', 61, to rock the yoke in one direction, or to allow it to rock in the other; about lugs 59 to establish the initial adjustment of the brake, this provision serving later as an adjustment for taking up wear. The ends of bosses 64 are serrated as at 66 (Figs. 4 and 6) to receive lugs 67 on the under faces of nuts 65, these serrations and lugs acting as means for locking the nuts in adjustment.

It will be noted by reference to Figs. 4 and 5 that one arm 68 of each clevis or, as may be more generally expressed, the head 69 of each clevis rides in a slot 70 sunk in the opposed faces of blocks 50. The side walls 70' of these slots thus form shoulders engaging the posts to hold them erect irrespective of the strain put upon them, the slots allowing for relative axial movement between ring 24 and posts 62 during brake actuation. When the yoke is pivotally rocked about pins 61, the clevises and pins 61 remain stationary and the relatively broad contacting faces between lugs 59 and bearing faces 51 take the strain and wear incidental to the relative bodily shift between the yokes and ring 24 as caused by the pivotal movement of the yoke. This provision of a fixed pivotal connection between the yoke and ring 25 and a shiftable pivotal connection between the yoke and ring 24, rather than a reversal of the position of the fixed and loose pivotal connection, allows the shifting movements to occur where they will cause minimum wear and where such wear as does occur will have the least effect.

Disconnectedly pinned at 71' to draft-tongue 57 of yoke 56 and extending through a clearance hole 71 in flange 25, is a link or pull rod 72 having its forked end 73 taking one arm of an actuating lever, here shown as bell-crank 74 (Figs. 1 and 7) though it will be understood this showing of a particular type of lever is not to be considered as limitative on the invention considered in its broader aspects. Lever 74 is pivotally supported from flange 25 on a pin 75 carried by bracket 76, the latter being welded or otherwise suitably attached to the flange. As indicated in Figs. 6 and 7, the face of flange 25 is preferably provided with a plurality of base lugs 77, to any one of which the brackets 76 may be attached, depending upon the particular nature and disposition of the brake rod of the vehicle to be equipped, it being understood that in some instances the brake rod runs parallel to the wheel axis and in other cases extends at right angles with respect thereto. Here brake rod 78 is indicated as running at right angles to the wheel axis and is pivotally connected at 79 with the free end of crank 74. Or, as shown in Fig. 7a, brake rod 78' may extend parallel to the wheel axis, in which case lever 74a extends at right angles to that axis. Pin 80 pivotally connects link 72 to bell crank 74.

The provision of the actuating crank, in the form of a lever mounted directly on one pressure ring (25) and the attachment of the actuating yoke through clevises 62 to that same ring is found to be of great advantage, for actuation of the lever then has the same effect as though the two pressure rings were simultaneously moved toward one another to compress the friction ring between them.

While any suitable means may be employed for limiting the spread of rings 24 and 25 under the influence of springs 35 to establish the full "off" condition of the brake, there is indicated in Fig. 7 a particular provision for this purpose. It constitutes a stop lug 81 which is adapted to limit the clockwise movement of bell-crank 74 as viewed in that figure, thus limiting the movement of link 72 and the upper end of yoke 56 to the left in Fig. 1. By thus limiting the left-wise swing of yoke 56, lugs 59 in their engagement with blocks 50 limit the movement of ring 24 to the left in Fig. 1, and thus establish the extent to which compression springs 35 may act.

It will be seen that when brake rod 78 is moved to the right in Fig. 7, bell-crank 74 is swung in a counter-clockwise direction, exerting a draft on link 72 and thus swinging yoke 56 in a clockwise direction, as viewed in Fig. 1, about clevis pins 61 as centers, bearing lugs 59 thus moving ring 24 to the right in Figs. 1 and 4 against the pressure of springs 35, and thus compressing friction ring 23 tightly between ring 24 and flange 25 to effect the braking action, it being understood that ring 23 is capable of bodily axial movement to insure an accomplishment of this end. The crank arrangement described allows the operator to apply great effective braking pressure without harshness.

When the draft on brake rod 78 is relieved, springs 35 act to restore the brake to an "off" position, as will be readily understood.

The operation of disassembling and reassembling the brake for the purpose of replacing worn friction rings is exceedingly simple. As the wheel is withdrawn from the axle, keys 41 are cleared from ring 23 and the yoke-side of the brake is fully exposed. Pin 71' is removed to clear tongue 57 from link 72, the yoke is rotated in a counter-clockwise direction, as viewed in Figs. 1 and 4, to clear hook ends 60 from clevis pins 61 and then pulled bodily clear of the assembly, whereupon ring 24 and friction ring 23 may be pulled, in that order, free from flange 25 and the parts mounted thereon, said flange and parts being otherwise undisturbed. A new friction ring may then be substituted and the entire brake reassembled in an order reverse to that just described.

While I have shown and described a preferred embodiment of my invention, it is to be understood that such showing and description are to be considered merely as illustrative of and not limitative of the broader claims appended hereto, for various changes in design, structure and arrangement may be made without departing from the spirit and scope of those claims.

I claim:

1. In a device of the character described, a pair of axially alined and spaced pressure rings mounted for relative axial movement towards and away from each other, a friction ring between the pressure rings, and means for moving said rings relatively toward each other and embodying a yoke pivotally connected to one of the pressure rings and engaging the other pressure ring, a lever mounted on said one ring, and a link connecting said lever and the yoke whereby movement of the lever swings the yoke pivotally.

2. In a device of the character described, a pair of axially alined and spaced pressure rings mounted for relative axial movement towards and away from each other, a friction ring between the pressure rings, and means for moving said pressure rings relatively toward each other and embodying a yoke, pivotal connections between the ends of the yoke-arms and one of said pressure rings, a pair of bearing faces on the other pressure ring, a pair of bearing faces, one on each of the yoke arms and engaging, one each, said bearing faces on the other pressure ring and being movable bodily with respect thereto, and means for moving the yoke pivotally.

3. In a device of the character described, a pair of axially alined and spaced pressure rings mounted for relative axial movement towards and away from each other, a friction ring between the pressure rings, and means for moving said pressure rings relatively toward each other and embodying a yoke, pin-and-hook pivotal connections between the ends of the yoke-arms and one of said pressure rings, a pair of bearing faces on the other pressure ring, a pair of bearing faces, one on each of the yoke arms and engaging, one each, said bearing faces on the other pressure ring and being movable bodily with respect thereto, and means for moving the yoke pivotally.

4. In a device of the character described, a pair of axially alined and spaced pressure rings mounted for relative axial movement towards and away from each other, a friction ring between the pressure rings, and means for moving said pressure rings relatively toward each other and embodying a yoke, a pair of posts arranged at diametrically opposite sides of one of the pressure rings and extending toward the other pressure ring, shoulders on said other ring engaging the posts to hold them erect, pivotal connections between said posts and the yoke arms, a pair of bearing faces on said other ring, a pair of bearing faces, one on each of the yoke arms and engaging, one each, said bearing faces on the other pressure ring and being movable bodily with respect thereto, and means for swinging the yoke about said pivotal connections.

5. In a device of the character described, a pair of axially alined and spaced pressure rings mounted for relative axial movement towards and away from each other, a friction ring between the pressure rings, and means for moving said pressure rings relatively toward each other and embodying a yoke, a pair of posts arranged at diametrically opposite sides of one of the pressure rings and extending toward the other pressure ring, said posts being adjustably shiftable in the direction of their axes, shoulders on said other ring engaging the posts to hold them erect, pivotal connections between said posts and the yoke arms, a pair of bearing faces on said other ring, a pair of bearing faces, one on each of the yoke arms and engaging, one each, said bearing faces on the other pressure ring and being movable bodily with respect thereto, and means for swinging the yoke about said pivotal connections.

6. In a device of the character described, a pair of axially alined, relatively rotatable members, a pair of pressure rings mounted, on one of said members, said rings being mounted for relative axial movement towards and away from each other, a friction ring between the pressure rings, and means for moving said pressure rings relatively toward each other to compress the friction ring between them, said means embodying an actuating member pivotally connected to one of said pressure rings and having bearing members engaging the other pressure ring at diametrically opposite points; reinforced areas on said other ring adjacent said points, and reinforcing ribs extending angularly from said areas to the outer periphery of the ring at points angularly spaced thereabout.

7. In a device of the character described, a pair of axially alined, relatively rotatable members, a pair of pressure rings mounted on one of said members, said rings being mounted for relative axial movement towards and away from each other, a friction ring between the pressure rings, and means for moving said pressure rings relatively toward each other to compress the friction ring between them, said means embodying an actuating member pivotally connected to one of said pressure rings and having bearing members engaging the other pressure ring at diametrically opposite points; inner and outer marginal flanges extending from one side face of said other ring, reinforced areas on said other ring between said flanges and adjacent said diametrically opposite points, and ribs extending angularly from the inner flange at points adjacent the reinforced area to the outer flange at points spaced angularly thereabout.

ERNEST E. BERGLAND.